(12) United States Patent
Shimada

(10) Patent No.: US 8,818,818 B2
(45) Date of Patent: Aug. 26, 2014

(54) AUDIO ENCODING DEVICE, METHOD, AND PROGRAM WHICH CONTROLS THE NUMBER OF TIME GROUPS IN A FRAME USING THREE SUCCESSIVE TIME GROUP ENERGIES

(75) Inventor: Osamu Shimada, Tokyo (JP)

(73) Assignee: NEC Corporation, Tokyo (JP)

( * ) Notice: Subject to any disclaimer, the term of this patent is extended or adjusted under 35 U.S.C. 154(b) by 1294 days.

(21) Appl. No.: 12/307,897

(22) PCT Filed: Jul. 6, 2007

(86) PCT No.: PCT/JP2007/063537
§ 371 (c)(1),
(2), (4) Date: Jan. 7, 2009

(87) PCT Pub. No.: WO2008/004649
PCT Pub. Date: Jan. 10, 2008

(65) Prior Publication Data
US 2009/0326963 A1     Dec. 31, 2009

(30) Foreign Application Priority Data
Jul. 7, 2006   (JP) ................................ 2006-187364

(51) Int. Cl.
*G10L 21/00*   (2013.01)
*G10L 19/02*   (2013.01)
*H04N 9/475*   (2006.01)
*G10L 21/04*   (2013.01)
*H04B 1/66*    (2006.01)
*H04N 21/2368* (2011.01)

(52) U.S. Cl.
CPC ............ *G10L 21/04* (2013.01); *H04N 21/2368* (2013.01); *H04B 1/665* (2013.01)
USPC ........................... 704/503; 704/229; 348/515

(58) Field of Classification Search
CPC ..... G10L 21/04; H04B 1/665; H04N 21/2368
USPC ........................................................ 704/229
See application file for complete search history.

(56) References Cited

U.S. PATENT DOCUMENTS 6,124,895 A * 9/2000 Fielder .......................... 348/515
6,226,608 B1 * 5/2001 Fielder et al. ................. 704/229
6,487,535 B1 * 11/2002 Smyth et al. ................. 704/500

FOREIGN PATENT DOCUMENTS

JP   2001318684 A   11/2001
JP   2003108192 A   4/2003
JP   2003529787 A   10/2003
(Continued)

OTHER PUBLICATIONS

International Search Report for PCT/JP2007/063537 mailed Oct. 9, 2007.
(Continued)

*Primary Examiner* — Farzad Kazeminezhad
(74) *Attorney, Agent, or Firm* — Sughrue Mion, PLLC

(57) ABSTRACT

[PROBLEMS] To provide a high-quality audio signal encoding technique by controlling the number of time/frequency groups in a frame.
[MEANS FOR SOLVING PROBLEMS] An audio encoding device includes: a time group boundary candidate position extraction unit (101) for analyzing a sub-band signal (2001) obtained by frequency-changing an input signal and calculating a candidate position of the time group boundary by comparing change in energy of three successive time groups; a time group quantity generation unit (103) for outputting a maximum value of the time group quantity; a time group selection unit (102) for generating a time group quantity not greater than the maximum time group quantity by using the candidate position; and a frequency group generation unit (104) for generating a frequency group by using the generated time group information. The device generates a time/frequency group accurately reflecting a change of the input signal and performs operations while controlling the number of time/frequency groups in the frame.

26 Claims, 10 Drawing Sheets

(56) References Cited

FOREIGN PATENT DOCUMENTS

JP 2003345398 A 12/2003
JP 2006003580 A 1/2006

OTHER PUBLICATIONS

"Digital Radio Mondiale (DRM); System Specification", ETSI, TS 101 980 V1.1.1, paragraphs 5 and 6, Sep. 2001, pp. 42-57.

Dietz et al., "AES (Audio Engineering Society) Convention Paper 5553", 112 AES Convention, May 2002, pp. 1-8.

3rd Generation Partnership Project; Technical Specification Group Services and System Aspects; General Audio Codec Audio Processing Functions; Enhanced aacPlus General Audio Codec; Enhanced aacPlus Encoder SBR Part (Release 6), 3GPP TS 26.404 V6.0.0 (Sep. 2004, pp. 1-34.

* cited by examiner

AUDIO ENCODING DEVICE, METHOD, AND PROGRAM WHICH CONTROLS THE NUMBER OF TIME GROUPS IN A FRAME USING THREE SUCCESSIVE TIME GROUP ENERGIES

This application is the National phase of PCT/JP2007/063537, filed Jul. 6, 2007, which claims priority to Japanese Application No. 2006-187364, filed Jul. 7, 2006.

APPLICABLE FIELD IN THE INDUSTRY

The present invention relates to an audio encoding device, an audio encoding method, and an audio encoding program, and more particularly to an audio encoding device, an audio encoding method, and an audio encoding program for encoding a wide-band audio signal in a high quality with a little information quantity.

BACKGROUND ART

The method utilizing band division encoding is widely known as a technology capable of encoding a general acoustic signal with a little information quantity, and yet obtaining a high-quality reproduction signal. As a representative example of the encoding technique utilizing the band division, MPEG-2 AAC (Advanced Audio Coding), being an international standard technique of ISO/IEC, exists, and a wide-band stereo signal with 16 kHz or more can be encoded in a high quality at a bit rate of 96 kbps or so.

However, when the bit rate is lowered, for example, to 48 kbps or so, the band in which the high-quality audio signal can be encoded becomes equal to or less than 10 kHz or so, and the sound that subjectively feels insufficient in a high-band signal component is produced. As a method of compensating deterioration in a sound quality due to such a limit to the band, there exists, for example, the band expansion technology described in Non-patent document 1 that is called SBR (Spectral Band Replication). The similar technology is disclosed, for example, in Non-patent document 2 as well.

[Non-patent document 1] "Digital Radio Mondiale (DRM); System Specification", ETSI, TS 101 980 V1.1.1, paragraphs 5 and 6, September 2001

[Non-patent document 2] "AES (Audio Engineering Society) Convention Paper 5553", 112th AES Convention, May 2002

The band expansion technology, which aims at compensating a signal of a high-frequency band (high-band component) that is lost in an audio encoding process such as AAC or a band limiting process in accordance therewith, necessitates transmitting a signal (low-band component) of a band having a frequency lower than that of the band, which is compensated by the band expansion, by employing other means. Information encoded with the band expansion technology includes information that is employed for a purpose of generating a pseudo high-band component based upon the low-band component being transmitted with the other means, and adding the pseudo high-band component to the above low-band component at the time of decoding allows deterioration in a sound quality due to a limit to the band to be compensated.

The high-band component information being encoded with the band expansion technology includes energy information of the high-band component and addition signal information. The high-band energy information is calculated for each time/frequency group unit that is obtained by group-dividing a subband signal obtained by frequency-converting an input time signal in a time direction and a frequency direction, and getting a plurality of the subbands signal together. Calculating the energy information for each time/frequency group unit obtained by getting a plurality of the subbands signal together makes it possible to reduce a coding quantity to a requisite minimum. Hereinafter, the group dividing in the time direction is defined as time group generation, and the group dividing in the frequency direction as frequency group generation The method disclosed in Patent document 1 exists as a first conventional example of the time/frequency group generation. Upon making a reference to FIG. 10, the conventional time/frequency group generation unit, which includes a time group addition unit 902 for detecting a leading edge of the signal in a signal analysis unit 900 for analyzing the signal, and adding the time group at a predetermined time period when the leading edge has been detected, and a frequency group generation unit 904 for generating the frequency group so that the group number in the frequency direction becomes few when the leading edge has been detected, outputs time group information 9003 and frequency group information 9004.

The method disclosed in non-patent document 3 exists as a second conventional example. The group-dividing scheme in the time direction is for detecting only a head of the portion in which the signal is drastically enlarged, and generating a fixed-length time group when it has been detected, to begin with the head. The group-dividing scheme in the frequency direction is for reducing the number of the groups in the vicinity of the head divided by the detection.

The method disclosed in Patent document 2 exists as a third conventional example. The group-dividing scheme in the time direction is for calculating energy of the subband signal, comparing the above energy with energy of the neighboring region in the time direction, and dividing the time group when the energy becomes equal to or more than a predetermined threshold. The group dividing scheme in the frequency direction is for performing a process similar to the process performed in the time direction in the frequency direction after generating the time group, and generating the frequency group.

[Patent document 1] JP-P2003-529787A
[Patent document 2] JP-P2006-3580A
[Non-patent document 3] "Enhanced aacPlus general audio codec; Enhanced aacPlus encoder SBR part", 3GPP, TS 26.404 V6.0.0, September 2004

DISCLOSURE OF THE INVENTION

Problems to be Solved by the Invention

Each of the technologies described in the Patent document 1 and the non-Patent document 3 is for generating the time group in a predetermined time period at the moment of having detected the leading edge of the signal, whereby a change with time in the signal cannot be reflected accurately, precision declines, and a subjective sound quality deteriorates. Further, there is the case that the time group number within a frame cannot be controlled, and the time group number within the above frame is increased. In addition hereto, for example, the technology is for generating the time groups by the necessary number as far as the end of the above frame at a predetermined time period regardless of a detection position within the frame, whereby the time group number in the above frame is increased when the leading edge is detected in the head portion within a frame.

The method of generating the frequency group in each of the Patent document 1 and the Non-patent document 3 is for generating the frequency group without the time group number within the frame taken into consideration, relying only upon the leading edge of the signal, so the number of the time/frequency groups within the above frame cannot be controlled.

In the technology described in the Patent document 2, when a change in the signal within a frame is drastic, the boundary that becomes equal to more than the predetermined threshold occurs numerously and the time group number within the above frame is increased. The situation is similar with respect to the frequency direction, that is, when a change in the signal within a frame is drastic, the boundary that becomes equal to more than the predetermined threshold occurs numerously and the frequency group number within the above frame is increased When the number of the time/frequency groups within the frame is increased, the efficient encoding cannot be realized because the energy information quantity being encoded is increased. In the above-mentioned conventional examples, since a control of the number of the time groups or the frequency groups within in a frame is not taken, the number of the time/frequency groups within the above frame cannot be controlled, which causes the occurrence coding quantity to be biased for each frame unit.

As a result, in a case where, when the encoding is executed with a total occurrence coding quantity kept at a constant for each frame unit, the number of the time/frequency groups becomes numerous, and resultantly, the coding quantity of the energy information in the above frame is increased, other subsidiary information of the above frame and the encoding information of the low-band component are reduced in order to absorb an increase in the coding quantity of the energy information within the above frame, which causes the subjective sound quality to deteriorate. Further, in a case where, when a total occurrence coding quantity is maintained over a plurality of the frames, the number of the time/frequency groups becomes numerous, and resultantly, the coding quantity of the energy information in the above frame is increased, information of the next frame and the frame subsequent hereto is reduced in order to absorb an increase in the energy information quantity of the above frame, which causes the subjective sound quality to deteriorate.

Thereupon, the present invention has been accomplished in consideration of the above-mentioned problems, and an object thereof is to provide a high-quality audio encoding device, and a method and a program thereof by generating the time/frequency group into which a change in the input signal has been accurately reflected, and simultaneously therewith, controlling the number of the time/frequency groups within the frame, thereby to control the coding quantity that occurs.

Means for Solving the Problem

A first invention for solving the above-mentioned problems is characterized in, at the moment of encoding a signal obtained by frequency-converting an input audio signal for each time/frequency group unit: calculating a candidate for a boundary of the time group; generating a time group so that the time group quantity becomes equal to or less than a decided maximum time group quantity in accordance with the candidate; generating a frequency group by employing the time group information; and generating a time/frequency group.

A second invention for solving the above-mentioned problems is characterized in, in the above-mentioned first invention, deciding the maximum time group quantity by employing coding quantity information that occurred in the past at the moment of deciding it.

A third invention for solving the above-mentioned problems is characterized in, in the above-mentioned first invention, deciding the maximum time group quantity by employing usable coding quantity information at the moment of deciding it.

A fourth invention for solving the above-mentioned problems is characterized in, in one of the above-mentioned first to third inventions, selecting the group boundary from among the candidates so that a space of the time group boundary becomes equal to or more than a constant at the moment of generating the time group, thereby to generate it.

A fifth invention for solving the above-mentioned problems is characterized in, in one of the above-mentioned first to third inventions, adjusting a position of the candidate at the moment of generating the time group, thereby to generate it.

A sixth invention for solving the above-mentioned problems is characterized in, in one of the above-mentioned first to fifth inventions, generating the frequency group so that the frequency group number becomes few when the time group number is numerous at the moment of generating it.

An Advantageous Effect of the Invention

The present invention makes it possible to generate the time/frequency group into which a change in the input signal has been accurately reflected, and simultaneously therewith, to control the number of the time/frequency groups within the above frame, which enables the occurrence coding quantity to be controlled. As a result, the high-quality audio encoding device can be realized.

Figure 1:
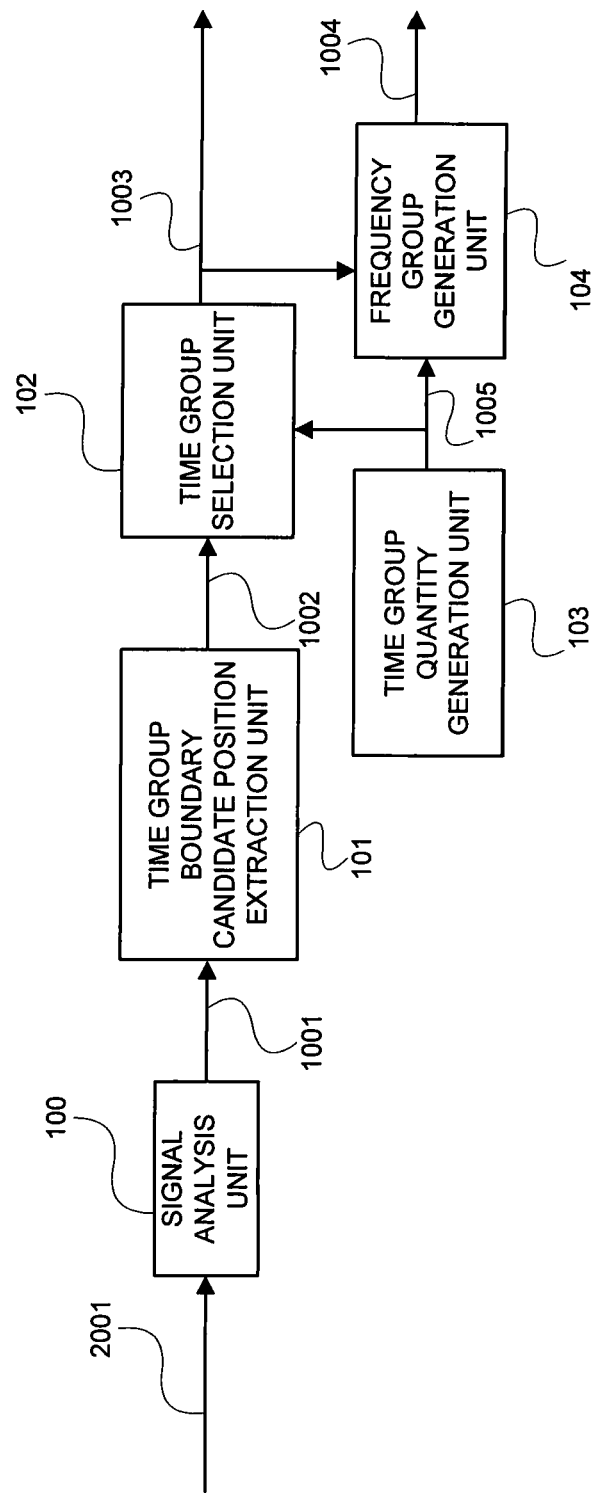
FIG. 1 is a block diagram illustrating a configuration of a time/frequency group generation unit in a first embodiment of the present invention.

DESCRIPTION OF NUMERALS 100 and 900 signal analysis units
101 time group boundary candidate position extraction unit
102 time group selection unit
103 time group quantity generation unit
104 frequency group generation unit
105 time group adjustment unit
106 time group number calculation unit
200 frequency conversion unit
201 and 211 time/frequency group generation units
202 encoding unit
203 multiplexing unit
204 low-band component encoding unit
205 high-band component encoding unit
1000 subband signal
1001 analysis information
1002 time group boundary position information
1003 and 9003 time group information
1004 and 9004 frequency group information
1005 and 1006 maximum time group quantity
2000 input signal
2001 subband signal
2002 time/frequency group information
2003 signal component information
2004 bit stream
2005 coding quantity information
2006 low-band component information
2007 high-band component information
600 computer
601 program
902 time group addition unit
904 frequency group generation unit
9002 leading edge detection information

BEST MODE FOR CARRYING OUT THE INVENTION

Next, the best mode for carrying out the present invention will be explained in details by making a reference to the accompanied drawings.

First Embodiment

Figure 2:
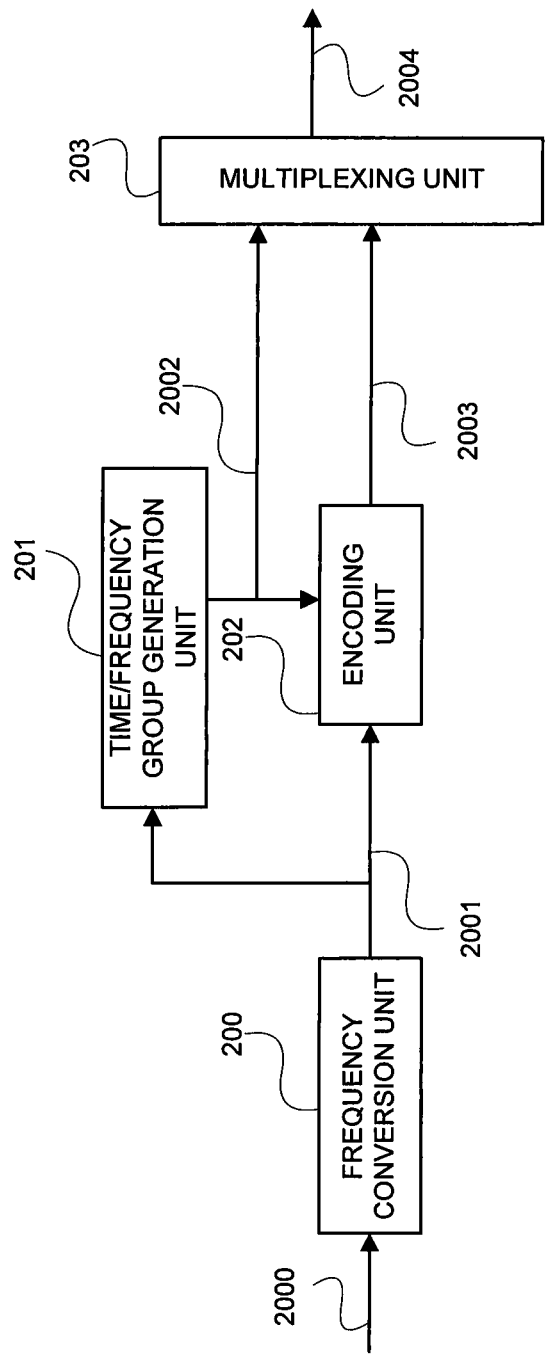
FIG. 2 is a block diagram illustrating a configuration of an audio encoding device in the first embodiment of the present invention.

Upon making a reference to FIG. 2, the audio encoding device of the first embodiment of the present invention is comprised of a frequency conversion unit 200, a time/frequency group generation unit 201, an encoding unit 202, and a multiplexing unit 203.

The frequency conversion unit 200 analyzes an input signal 2000, and outputs a subband signal 2001. The time/frequency group generation unit 201 analyzes the subband signal 2001, and generates time/frequency group information 2002 so that the number of the time/frequency groups into which a change in the signal has been reflected becomes equal to or less than a pre-decided number. The encoding unit 202 encodes energy information etc. of the subband signal 2001 for each time/frequency group unit according to the time/frequency group information 2002, and outputs signal component information 2003. The multiplexing unit 203 multiplexes the time/frequency group information 2002 and the signal component information 2003, and outputs each of them as a bit stream 2004.

Hereinafter, an operation of the time/frequency group generation unit 201 in the present invention, which plays an important role in order to realize the high-quality encoding, will be explained in details while a reference to FIG. 1 is made.

A signal analysis unit 100 analyzes energy of the subband signal 2001 for each minimum time group unit that is settable (hereinafter, referred to as a minimum time group unit). The number of sub-samples being included for each minimum time group unit could be one in some cases, and a plurality of the sub-samples of which number is two or more may be included for each minimum time group unit in some cases.

At this time, adding the subband signal in the frequency direction within the minimum time group, and using average energy enables an arithmetic quantity to be reduced. Further, the energy can be calculated not by averaging all of the subband signals within the minimum time group, but by averaging only the subband signals in some frequency band. On the other hand, calculating the energy within the minimum time group frequency band by frequency band, or calculating the energy for each unit obtained by getting a plurality of the frequency bands together makes it possible to finely express a change in the signal, and to calculate high-precision energy information.

Herein, it is also possible to correct the calculated energy information for a purpose of matching it to a characteristic in an auditory sense. For example, it is also possible to define a thing obtained by subjecting the energy to a logarithmic process as energy information because it is well known that a human being perceives a level of sound intensity in proportion to logarithm of the sound intensity as a characteristic in an auditory sense. The energy can be corrected also by employing a more complicated function or polynomial expression in addition to the simple logarithm. The polynomial expression approximating the logarithm, which is one example thereof, contributes to a reduction in the arithmetic quantity.

Smoothing the calculated energy information in the time direction makes it possible to avoid an excessive detection, and to generate the high-quality time group. When a plurality of pieces of energy information have been calculated in the frequency direction within the minimum time group, conducting the smoothing in the frequency direction as well makes it possible to avoid an excessive detection, and to generate the high-quality group.

The signal analysis unit 100 calculates the energy for each minimum time group unit, and outputs information of energy averaging and distribution or the like as the analysis information 1001.

A time group boundary candidate position extraction unit 101 calculates a candidate for a time group boundary within the frame and its priority order by employing the analysis information 1001, and outputs it as time group boundary position information 1002. A portion in which a change in energy information E(n) calculated for each minimum time group unit is large is assumed to be a candidate for a time group boundary. The time group boundary, which includes the portion in which a change is larger, is given a higher priority order.

With a difference of the energy information calculated for each neighboring minimum time group unit defined as a change quantity, a portion, in which the change quantity is equal to more than the threshold (the change quantity satisfies the following expression), is defined as a candidate for a time group boundary.

$$E(n)-E(n-1)>A$$

Where n represents a time index of the minimum time group unit, and A is a threshold. At this time, it is also possible to change the threshold A, depending upon a value of averaging or dispersion that are included in the analysis information 1001.

It is also possible to select the candidate for the time group boundary not by calculating the change quantity only from the neighboring energy information but by employing a plurality of pieces of energy information, thereby to calculate the change quantity. For example, a portion, in which the following condition equation is satisfied by employing the energy for each unit of three minimum time groups, can be defined as a candidate for a time group boundary.

$$\{E(n)-E(n-1)\}\times\{E(n)-E(n-2)\}>B$$

Where n represents a time index of the minimum time group unit, and B is a threshold. At this time, it is also possible to change the threshold B, depending upon a value of averaging or dispersion that are included in the analysis information 1001.

In a situation where a plurality of pieces of the energy information have been calculated in the frequency direction within the minimum time group, the change quantities in the time direction in respective frequency bands are calculated, and a portion in which a sum of the change quantities in each frequency band is abnormal with respect to the threshold is defined as a candidate for a time group boundary. At this time, besides addition of the change quantity in each frequency band, the change quantity of the frequency band of which the change quantity is largest may be employed in some cases, and the weighted change quantity of each frequency band may be employed in some cases. As a result, an importance degree of each frequency band can be reflected frequency band by frequency band, and the candidate for the high-quality time group boundary can be calculated.

Besides the calculation of the energy change quantity for each minimum group unit, a minimum value and a maximum value of the energy are calculated in the time direction, to begin with a head of the frame, and a point as well in which a difference between the minimum value and the maximum value has become equal to or more than the threshold can be defined as a candidate for the time group boundary. At this time, the threshold can be also changed according to a value of the averaging and the dispersion that are included in the analysis information 1001. As a result, the high-quality time group information can be generated because a maximum error of the energy information being included within the identical time group becomes equal to or less than a half of the threshold.

The time group quantity generation unit 103 outputs a pre-decided maximum time group quantity (a number of the groups with maximum time) 1005 within one frame. The maximum time group quantity 1005 is pre-decided by a sampling frequency of the input signal, a bit rate, a time length of one frame, etc.

The time group selection unit 102 selects the group boundary from among the candidates for the time group boundary being included in the time group boundary position information 1002 so that the time group quantity being generated becomes equal to or less than the maximum time group quantity 1005. When the time group quantity obtained by selecting all of the candidates for the time group boundary and generating the time group becomes equal to or less than the maximum time group quantity, the time group selection unit 102 selects all of the candidate positions and generates the time group.

When the time group quantity obtained by selecting all of the candidates for the time group boundary and generating the time group is larger than the maximum time group quantity, the time group selection unit 102 selects the time group candidate according to a priority order being included in the time group boundary position information 1002 so that the quantity of the generated time groups becomes equal to or less than the maximum time group quantity.

When either of the lengths of two time groups that are generated by newly selecting the boundary at the moment of selecting the candidate according to the priority order becomes equal to or less than the threshold, the time group selection unit 102 can take a choice of not selecting its candidate position. As a result, the group with a minute time is prevented from being generated, and generation of the non-efficient time group can be suppressed.

The frequency group generation unit 104 generates frequency group information 1004 by employing generated time group information 1003 and the maximum time group quantity 1005. When the quantity of the generated time groups is equal to the maximum time group quantity, the frequency group generation unit 104 enlarges a space of the frequency group boundary, reduces the number of the time/frequency groups, and suppresses the occurrence coding quantity. When the quantity of the generated time groups is fewer than the maximum time group quantity 1005, the frequency group generation unit 104 sets a space of the frequency group boundary at a small level, and generates the high-precision time/frequency group. At this time, it is possible to set a space of the frequency group boundary for each time group unit responding to the number of the generated time groups without always reducing a space of the frequency group boundary. For example, with the time group of which the time group length is shorter than the threshold, a space of the frequency group is set hereto at a small level. By making the threshold variable according to the time group number, the number of the time/frequency groups being generated can be controlled.

With this embodiment, the time group candidate into which a change in the signal has been reflected can be calculated together with the priority order, and the calculation can be realized with the low arithmetic quantity because the candidate position is selected so that the pre-decided time group number is obtained. Further, the occurrence coding quantity can be equalized for each frame unit because a control of the number of the time/frequency groups can be taken for each frame unit.

Second Embodiment

Figure 3:
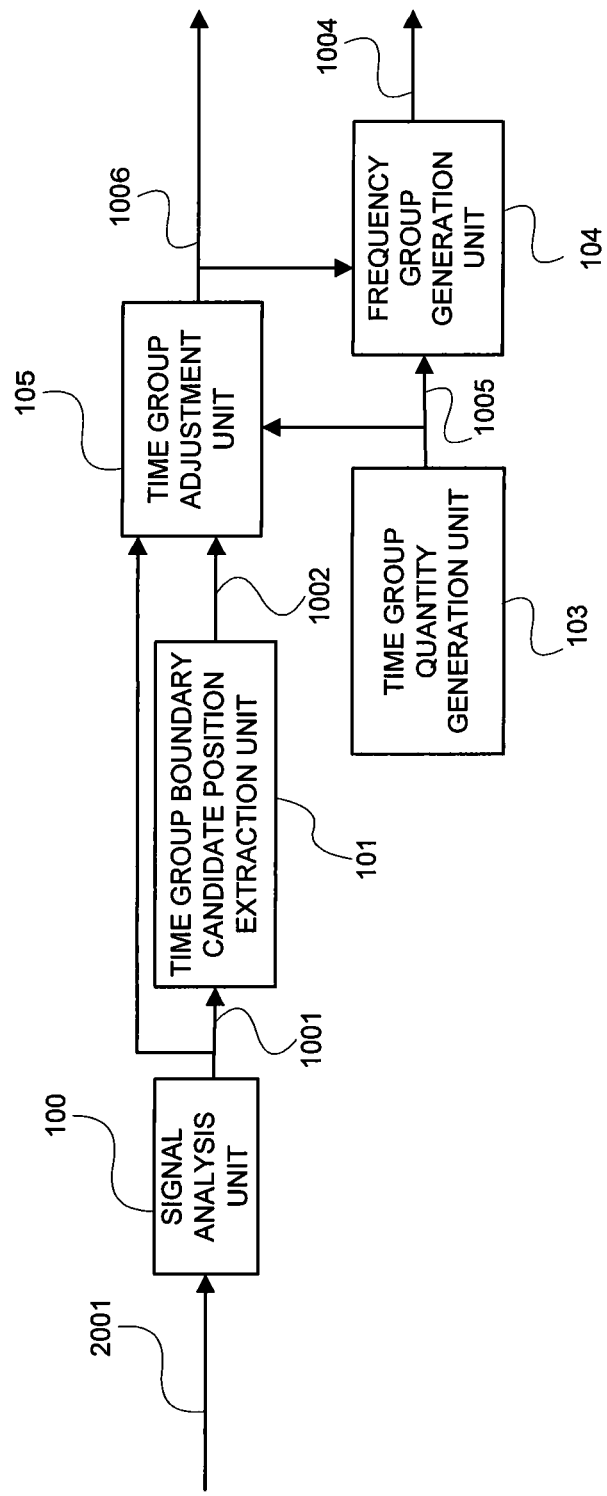
FIG. 3 is a block diagram illustrating a configuration of the time/frequency group generation unit in a second embodiment of the present invention.

The audio encoding device of the second embodiment of the present invention, as compared with that of the first embodiment, is characterized in including a time group adjustment unit 105 within the time/frequency group generation unit. Other parts are identical to that of the first embodiment of the present invention. Hereinafter, an operation of the time group adjustment unit 105, which is characteristic of this embodiment, will be explained while a reference to FIG. 3 is made.

The time group adjustment unit 105 generates time group information 1006 by employing the time group boundary position information 1002, the analysis information 1001, and the maximum time group quantity 1005. At this time, the time group adjustment unit 105 sets the time group so that the time group quantity becomes equal to or less than the maximum time group quantity 1005 outputted from the time group quantity generation unit 103. When the time group quantity obtained by selecting all of the candidates for the time group boundary and generating the time group is equal to or less than the maximum time group quantity, the time group adjustment unit 105 selects all of the candidate positions and generates the time group.

When the time group quantity obtained by selecting all of the candidates for the time group boundary and generating the time group is larger than the maximum time group quantity, the time group adjustment unit 105 generates the time group according to the priority order being included in the time group boundary position information 1002 so that the quantity of the generated time groups becomes equal to or less than the maximum time group quantity.

When either of the lengths of two time groups that are generated by newly selecting the boundary at the moment of selecting the candidate according to the priority order becomes equal to or less than the threshold, the time group adjustment unit 105 does not select its candidate position, and adjusts the time group boundary position so that the time group length, which is shorter, becomes equal to or more than the threshold. For example, upon thinking about the case that the time group boundary exists between positions of time N and time N+M, and the candidate for the new time group boundary is time N+K (K<M/2), it follows that the lengths of the two time group being newly generated are K and M−K, respectively. At this time, when K is equal to or less than the threshold, the time group adjustment unit 105 selects K' such that it becomes equal to or more than the threshold, and sets the time group boundary in a position of a time N+K'. At this time, when M−K' becomes equal to or less than the threshold, the time group adjustment unit 105 does not set the time group boundary.

At the moment of calculating new K', K' can be also calculated so that dispersion of the energy within the time group that is divided into two becomes small, respectively, by employing the analysis information. In this case, an error that is generated at the time of having encoded the signals within the identical time group can be reduced, and the high-quality encoding device can be realized.

While the method employing the energy dispersion value was explained as a method of calculating the foregoing K', the numerical value being employed, which is not limited to the energy dispersion value, could be an index indicating en error of the signal existing in the identical time group.

This embodiment makes it possible to generate the higher-quality time group as compared with the first embodiment of the present invention because the group with a minute time is prevented from being generated, and a change with time in the signal can be accurately expressed while generation of the non-efficient time group is suppressed.

Third Embodiment

Figure 4:
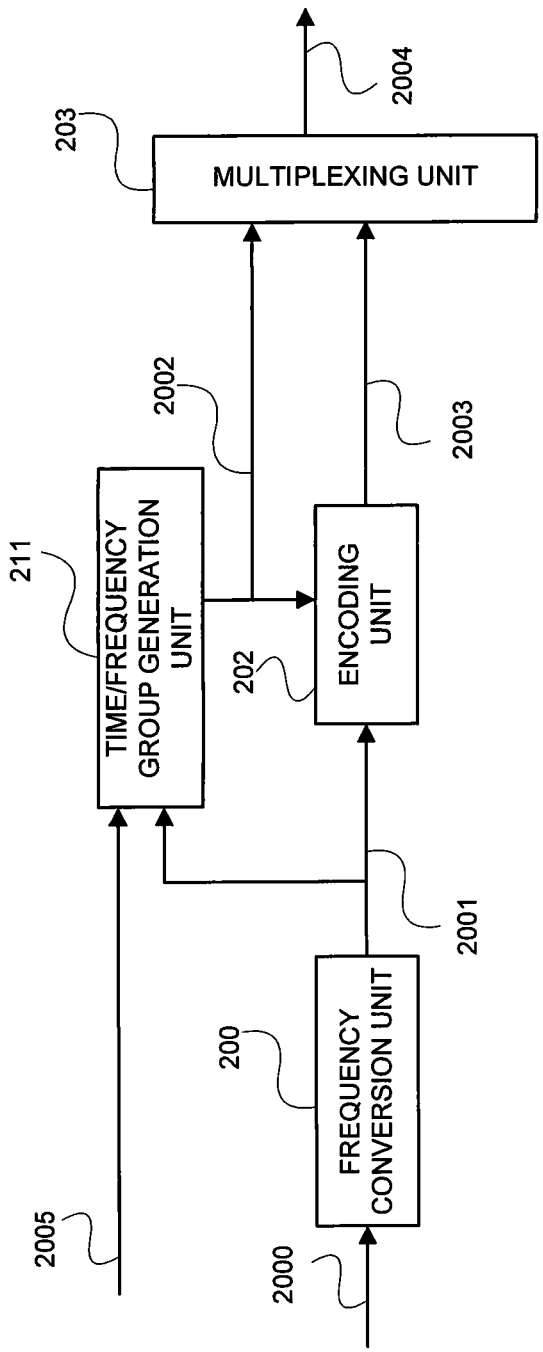
FIG. 4 is a block diagram illustrating a configuration of the audio encoding device in a third embodiment of the present invention.
Figure 5:
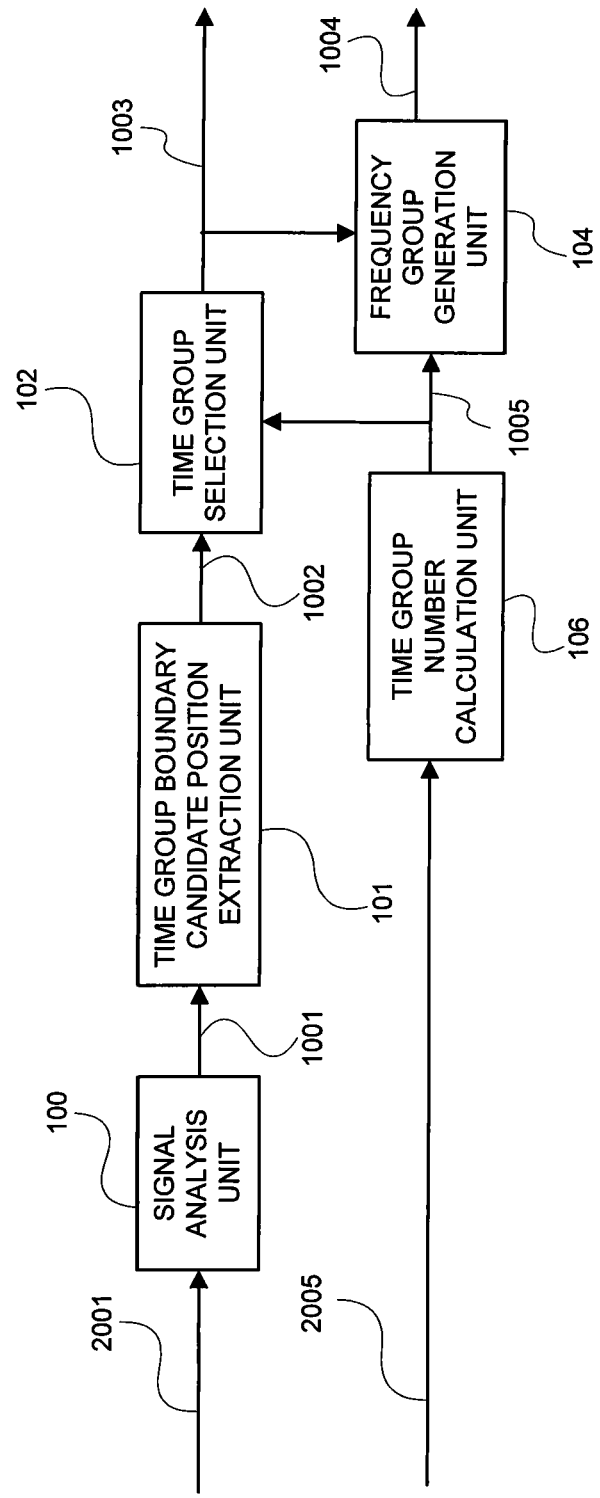
FIG. 5 is a block diagram illustrating a configuration of the time/frequency group generation unit in a third embodiment of the present invention.

Upon making a reference to FIG. 4, the audio encoding device of the third embodiment of the present invention, as compared with that of the first embodiment, is characterized in including a time/frequency group generation unit 211 for generating the time/frequency group by employing the sub-band signal and the coding quantity information. A comparison of the time/frequency group generation unit 201 in the first embodiment of FIG. 2 with the time/frequency group generation unit 211 in the third embodiment of FIG. 4 demonstrates that the time/frequency group generation unit 211 in the third embodiment of the present invention is characterized in including a time group number calculation unit 106. Hereinafter, an operation of the time group number calculation unit 106, which is characteristic of this embodiment, will be explained while a reference to FIG. 5 is made.

The time group number calculation unit 106 generates the maximum time group quantity 1005 by employing coding quantity information 2005. It is, for example, a buffer residual quantity that can be employed as the coding quantity information 2005. The so-called buffer residual quantity is a residual quantity of the buffer that is used for absorbing the variable-length coding quantity that occurs for each one-frame unit at the moment of maintaining a total occurrence coding quantity over a plurality of the frames. When the coding quantity equal to or more than the average coding quantity has occurred on a certain frame, the buffer residual quantity is increased, and when the coding quantity equal to or less than the average coding quantity has occurred, the buffer residual quantity is decreased. The occurrence coding quantity has to be suppressed so that the buffer residual quantity becomes empty, or it does not exceed a buffer size.

When the buffer residual quantity is little, the maximum time group quantity is enlarged because occurrence of a lot of the coding quantity is permitted. To the contrary, when the buffer residual quantity has become much, the maximum time group quantity is lessened because the occurrence coding quantity needs to be reduced. For example, the maximum time group quantity can be expressed by employing the buffer residual quantity as $$\text{maximum time group quantity} = \text{ceil}(\alpha*(1-\text{buffer residual quantity/buffer size})).$$

Where α is constant, and ceil (x) is for returning an integral value obtained by rounding up x. As a result, it becomes possible to calculate the maximum time group quantity responding to the buffer residual quantity.

While the maximum time group quantity varies linearly responding to the buffer residual quantity in the above equation, the maximum time group quantity 1005 further can be calculated by employing a complicated equation. Employing the above equation enables the maximum time group quantity to be calculated with the low arithmetic quantity.

The example employing the buffer residual quantity indicating a status of the past coding quantity as the coding quantity information 2005 was explained in this embodiment; however, as an another example, when the coding quantity that can be used for each frame unit is changed, the maximum time group quantity can be calculated by employing the coding quantity usable in the above frame.

This embodiment makes it possible to realize an appropriate control of the occurrence coding quantity over a plurality of the frames as compared with the first embodiment because the maximum time group quantity can be caused to vary for each frame unit responding to the coding quantity information.

Fourth Embodiment

Figure 6:
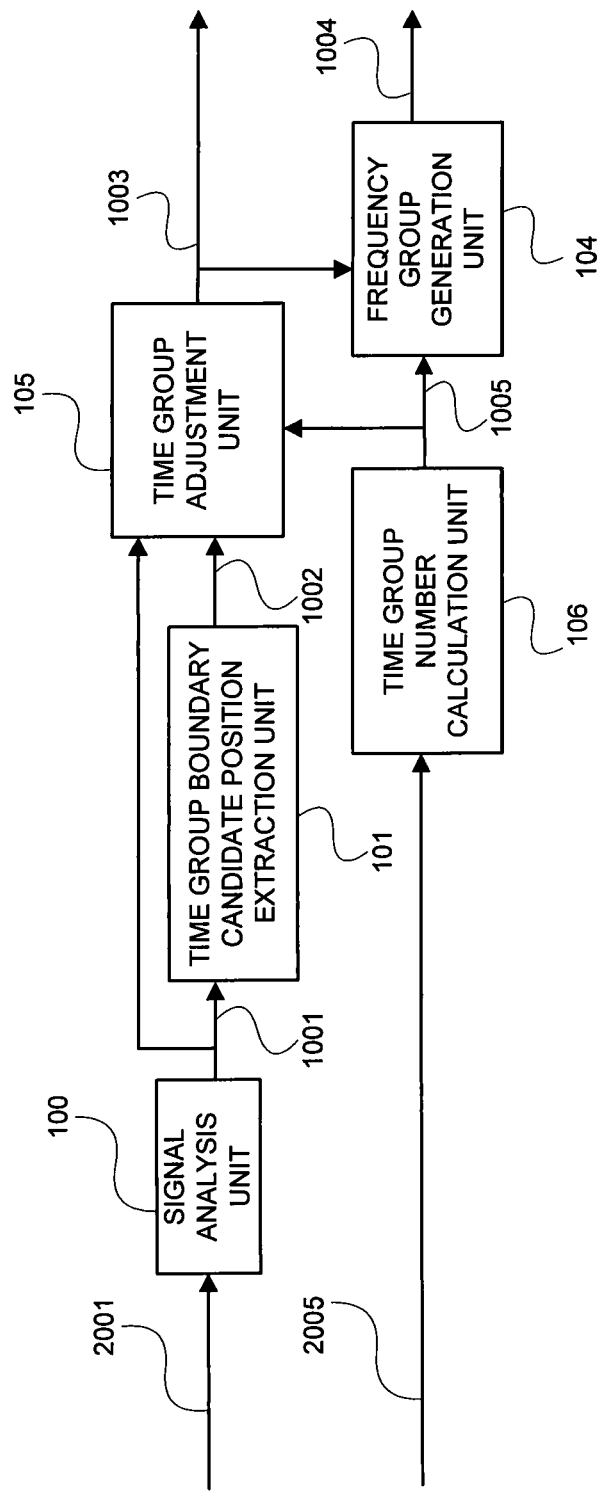
FIG. 6 is a block diagram illustrating a configuration of the time/frequency group generation unit in a fourth embodiment of the present invention.

Upon making a reference to FIG. 6, the audio encoding device of the fourth embodiment of the present invention, as compared with that of the third embodiment, is characterized in including a time group adjustment unit 105 within the time/frequency group generation unit. Other parts are identical to that of the third embodiment of the present invention.

The above time group adjustment unit 105 is identical to the time group adjustment unit 105 explained in the second embodiment of the present invention.

This embodiment, as compared with the second embodiment, makes it possible to realize an appropriate control of the occurrence coding quantity over a plurality of the frames because the maximum time group quantity can be caused to vary for each frame unit responding to the coding quantity information 2005. This embodiment, as compared with the third embodiment, makes it possible to realize an appropriate control of the occurrence coding quantity over a plurality of the frames because the group with a minute time is prevented from being generated, generation of the non-efficient time group can be suppressed, and a change with time in the signal can be accurately expressed.

Fifth Embodiment

Figure 7:
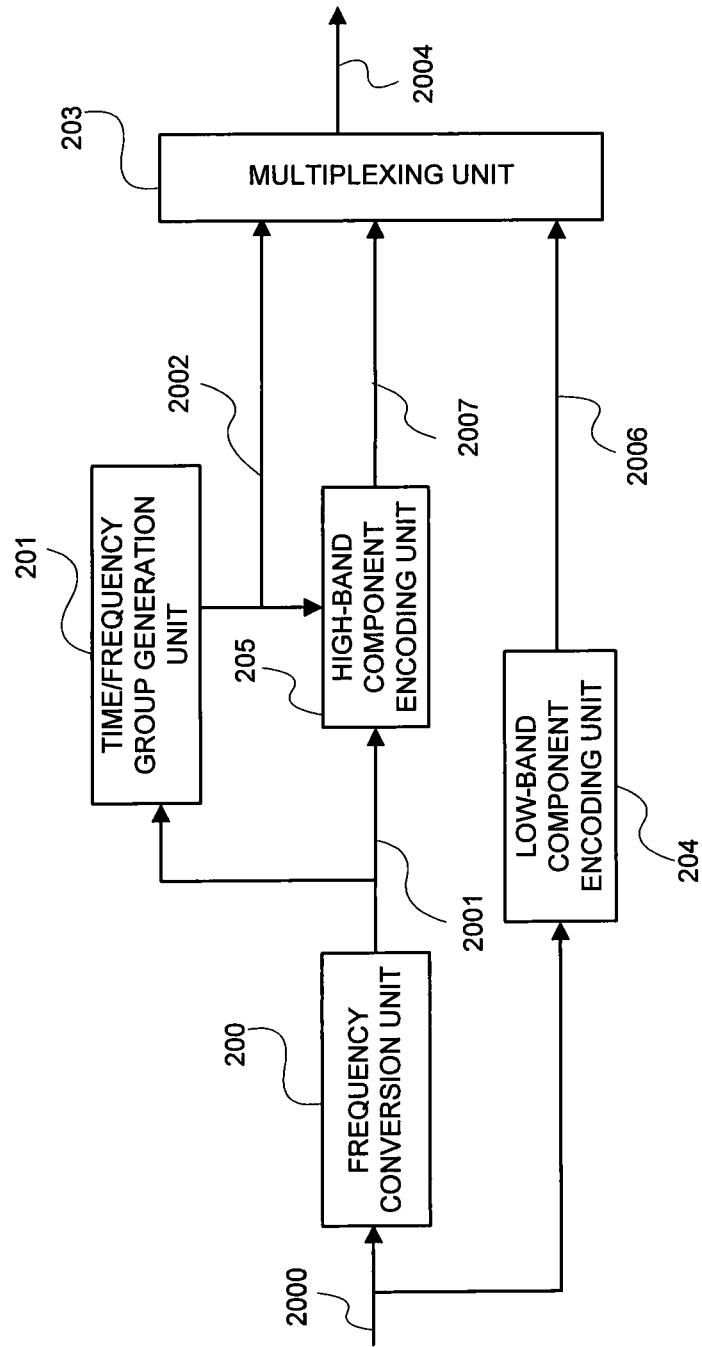
FIG. 7 is a block diagram illustrating a configuration of the audio encoding device in a fifth embodiment of the present invention.

The present invention is applicable also at the moment of classifying the input signal into the low-band component and the high-band component, thereby to encode it. Upon making a reference to FIG. 7, the fifth embodiment of the present invention is configured of a frequency conversion unit 200, a time/frequency group generation unit 201, a low-band component encoding unit 204, a high-band component encoding unit 205, and a multiplexing unit 203.

The low-band component encoding unit 204 encodes the low-band component of an input signal 2000 by employing the encoding technique such as AAC, and outputs low-band component information 2006. The frequency conversion unit 200 analyzes the input signal 2000, and outputs a subband signal 2001. The time/frequency group generation unit 201 analyzes the subband signal 2001, and generates time/frequency group information 2002 so that the number of the time/frequency groups into which a change in the signal has been reflected becomes equal to or less than the pre-decided number. The high-band component encoding unit 205 encodes energy information etc. of the high-band frequency band of the subband signal 2001 according to time/frequency group information 2002, and outputs high-band component information 2007. The multiplexing unit 203 multiplexes the time/frequency group information 2002, high-band component information 2007, and low-band component information 2006, and outputs each of them as a bit stream 2004.

This embodiment is for calculating energy or amplitude information of the high-band signal, and additional information other than it for each unit of the time/frequency group information 2002 calculated in the time/frequency group generation unit 201. The signal waveform itself does not need to be encoded, and it is enough only to encode the information calculated for each time/frequency group unit because a human being's resolution ability for the high-band signal declines as compared with the resolution ability for the low-band signal as a characteristic in an auditory sense. As a result, the encoding at a low bit rate is enabled.

The time/frequency group generation unit 201 performs an operation identical to the process explained in the first and second embodiments of the present invention.

This embodiment makes it possible to calculate the time group boundary candidate, into which a change in the signal has been reflected, together with the priority order, and to realized the calculation with the low arithmetic quantity because the candidate position is selected so that the pre-decided time group number is obtained. Further, a control of the number of the time/frequency groups for each frame unit is enabled. As a result, deterioration in the subjective sound quality due to a drastic decrease in the coding quantity of the low-band component encoding unit can be avoided because the coding quantity necessary for encoding the high-band signal for each frame unit does not protrude.

Sixth Embodiment

Figure 8:
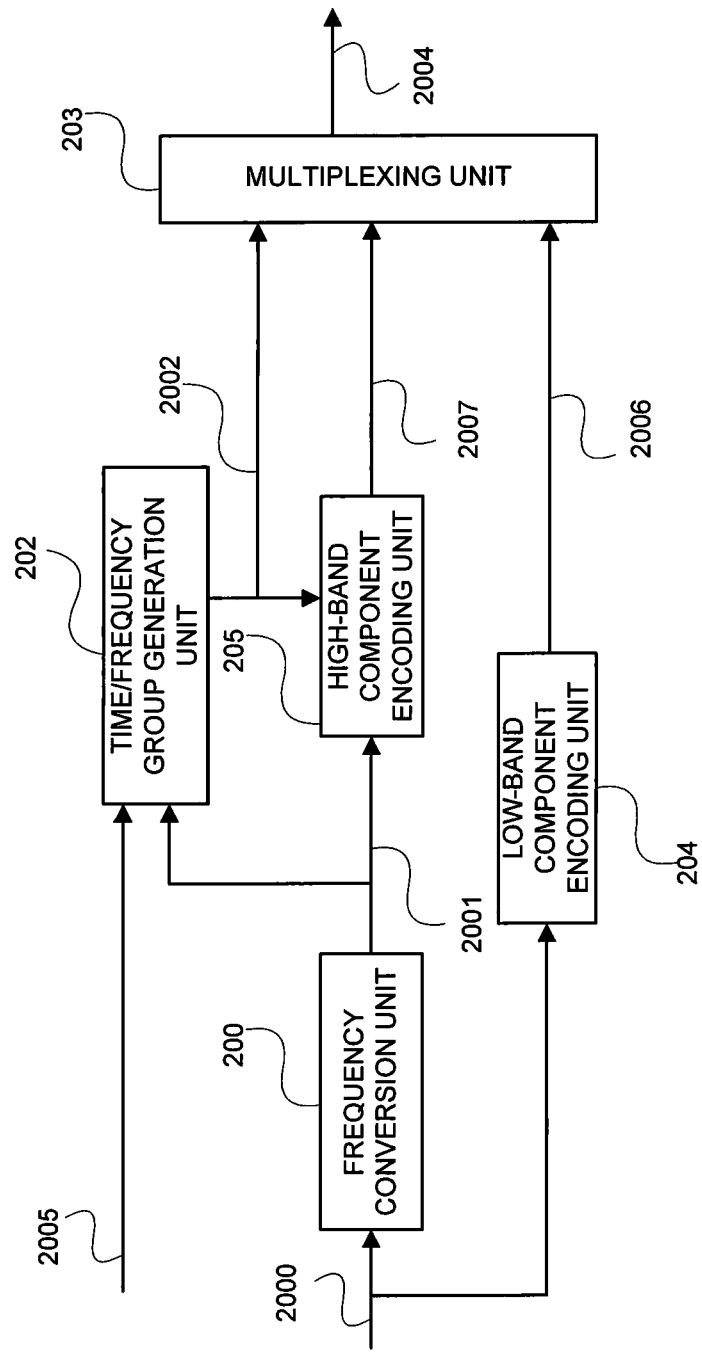
FIG. 8 is a block diagram illustrating a configuration of the audio encoding device in a sixth embodiment of the present invention.

Upon making a reference to FIG. 8, the sixth embodiment of the present invention, as compared with the fifth embodiment, is characterized in including a time/frequency group generation unit 202 for employing the coding quantity information, thereby to generate time/frequency group information. The time/frequency group generation unit 202 performs an operation identical to the process explained in the third and fourth embodiments of the present invention.

This embodiment, as compared with the fifth embodiment of the present invention, makes it possible to generate the high-quality time group because the group with a minute time is prevented from being generated, and a change with time in the signal can be accurately expressed while generation of the non-efficient time group is suppressed. Further, deterioration in the subjective sound quality due to a drastic decrease in the coding quantity of the low-band component encoding unit can be avoided because the coding quantity necessary for encoding the high-band signal for each frame unit does not protrude owing to a control of the number of the time/frequency groups for each frame unit.

Seventh Embodiment

Figure 9:
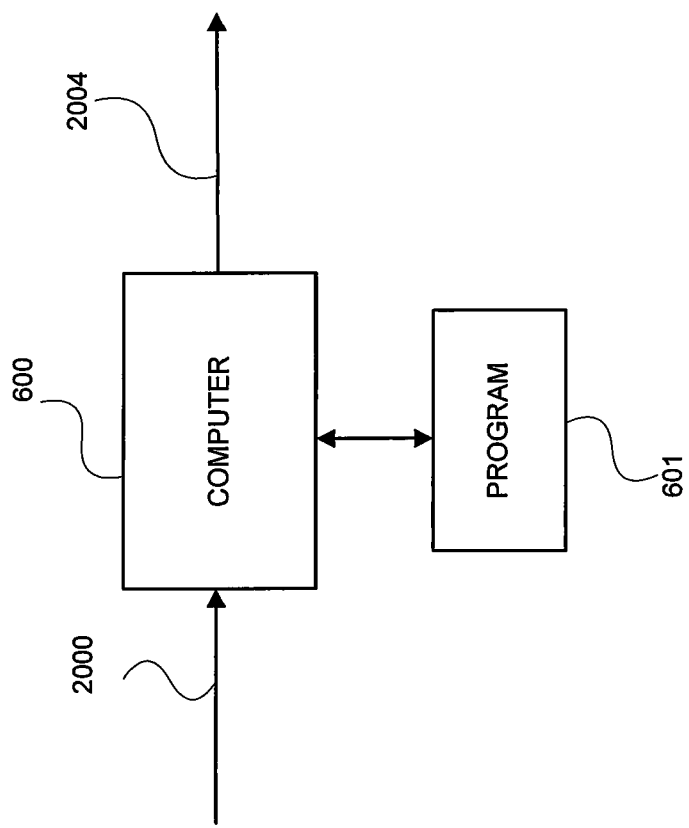
FIG. 9 is a configuration view illustrating an audio encoding program in a seventh embodiment of the present invention.
Figure 10:
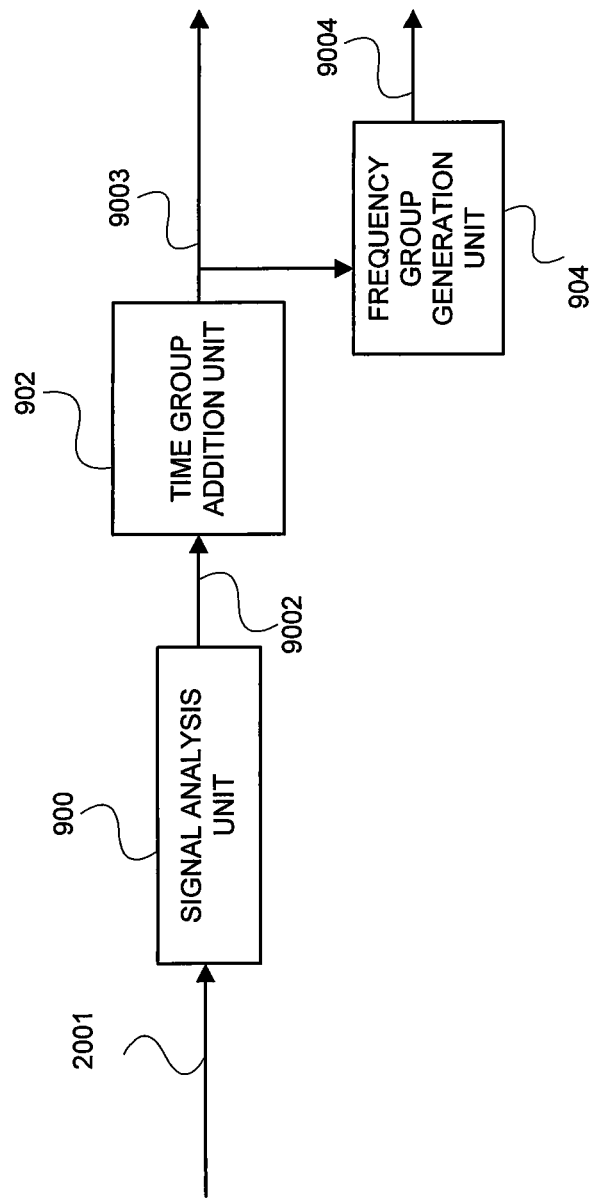
FIG. 10 is a block diagram illustrating a configuration of the conventional time/frequency group generation unit.

Next, the seventh embodiment of the present invention will be explained in details by making a reference to the accompanied drawings. Upon making a reference to FIG. 9, on the assumption that the foregoing first to sixth embodiments of the present invention are configured of a program 601, respectively, the seventh embodiment of the present invention is represented by a configuration view of a computer 600 that operates under the above program 601.

The program 601, which is loaded into the computer 600 (central processing unit; processor; data processing device), controls an operation of the computer 600 (central processing unit; processor; data processing device). The computer 600 (central processing unit; processor; data processing device) performs a process identical to the process explained in the foregoing first to fourth embodiments of the present invention under control of the program 601, thereby to output a bit stream 2004 from an input signal 2000.

While the energy of the subband signal was employed for explanation in the embodiments of the present invention, the numerical value being employed is not limited to the energy of the subband signal. For example, the embodiments of the present invention can be realized also by employing the index obtained by converting the amplitude or the signal with a certain function, and it is appreciated that those skilled in the art, upon attaining and understanding of the foregoing, may readily conceive of alterations to, variations of, and equivalents to these embodiments within a scope of the technical spirit of the present invention.

This application is based upon and claims the benefit of priority from Japanese patent application No. 2006-187364, filed on Jul. 7, 2006, the disclosure of which is incorporated herein in its entirety by reference.

The invention claimed is:

1. An audio encoding device for conducting grouping of a subband signal obtained by frequency-converting an input audio signal in a time direction and a frequency direction for each frame unit, and encoding the signal for each unit of the grouping, characterized in comprising:
a candidate extraction unit for calculating a candidate for a group boundary in the time direction;
a maximum value generation unit for generating a maximum value of a group number in the time direction;
a time group generation unit for employing said candidate, thereby to conduct the grouping in the time direction so that a space of the boundary of the group being generated in the time direction becomes equal to or more than a constant and yet the group number in the time direction becomes equal to or less than said maximum value, and to generate time direction group information; and a frequency group generation unit for conducting the grouping in the frequency direction by employing said maximum value and said time direction group information, wherein said maximum value of said group number is made variable according to coding quantity information, wherein a maximum time group quantity is determined in response to a buffer residual quantity, where the coding quantity information is the buffer residual quantity;

wherein the candidate for the group boundary in time direction is selected by comparing change in energy information of three successive time groups.

2. An audio encoding device according to claim 1, characterized in that said maximum value generation unit decides said maximum value by employing coding quantity information that occurred in the past.

3. An audio encoding device according to claim 1, characterized in that said maximum value generation unit decides said maximum value by employing usable coding quantity information.

4. An audio encoding device according to claim 1, characterized in that said time group generation unit generates the time group so that a time group quantity becomes said maximum value when the number of said candidates is less than or equal to said maximum value, the time group quantity corresponding to a number of time groups or a group number being generated.

5. An audio encoding device according to claim 1, characterized in that said time group generation unit generates the time group by employing all of said candidates when the number of said candidates is fewer than said maximum value.

6. An audio encoding device according to claim 1, characterized in that said time group generation unit settles the group boundary at a position different from that of said candidate so that the space of the boundary of the group being generated in the time direction becomes equal to or more than a constant.

7. An audio encoding device according to claim 1, characterized in that said frequency group generation unit conducts the grouping in the frequency direction by employing a difference between said maximum value and the number of said groups generated in the time direction.

8. An audio encoding method of conducting grouping of a subband signal obtained by frequency-converting an input audio signal in a time direction and a frequency direction for each frame unit, and encoding the signal for each unit of the grouping, characterized in:

calculating a candidate for a group boundary in the time direction;

generating a maximum value of a group number in the time direction;

employing said candidate, thereby to conduct the grouping in the time direction so that a space of the boundary of the group being generated in the time direction becomes equal to or more than a constant and yet the group number in the time direction becomes equal to or less than said maximum value, and to generate time direction group information;

and conducting the grouping in the frequency direction by employing said maximum value and said time direction group information, wherein said maximum value of said group number is made variable according to coding quantity information, wherein a maximum time group quantity is determined in response to a buffer residual quantity, where the coding quantity information is the buffer residual quantity;

wherein the candidate for the group boundary in time direction is selected by comparing change in energy information of three successive time groups.

9. An audio encoding method according to claim 8, characterized in, at the moment of generating said maximum value, deciding said maximum value by employing coding quantity information that occurred in the past.

10. An audio encoding method according to claim 8, characterized in, at the moment of generating said maximum value, deciding said maximum value by employing usable coding quantity information.

11. An audio encoding method according to claim 8, characterized in, at the moment of generating said time group, generating the time group so that a time group quantity becomes said maximum value when the number of said candidates is less than or equal to said maximum value, the time group quantity corresponding to a number of time groups or a group number being generated.

12. An audio encoding method according to claim 8, characterized in, at the moment of generating said time group, generating the time group by employing all of said candidates when the number of said candidates is fewer than said maximum value.

13. An audio encoding method according to claim 8, characterized in, at the moment of generating said time group, settling the group boundary at a position different from that of said candidate so that the space of the boundary of the group being generated in the time direction becomes equal to or more than a constant.

14. An audio encoding method according to claim 8, characterized in, at the moment of generating said frequency group, conducting the grouping in the frequency direction by employing a difference between said maximum value and the number of said groups generated in the time direction.

15. A non-transitory computer-readable data storage medium storing an audio encoding program for conducting grouping of a subband signal obtained by frequency-converting an input audio signal in a time direction and a frequency direction for each frame unit, and encoding the signal for each unit of the grouping, characterized in causing an information processing device to execute the processes of:

calculating a candidate for a group boundary in the time direction;

generating a maximum value of a group number in the time direction;

employing said candidate, thereby to conduct the grouping in the time direction so that a space of the boundary of the group being generated in the time direction becomes equal to or more than a constant and yet the group number in the time direction becomes equal to or less than said maximum value, and to generate time direction group information;

and conducting the grouping in the frequency direction by employing said maximum value and said time direction group information, wherein said maximum value of said group number is made variable according to coding quantity information, wherein a maximum time group quantity is determined in response to a buffer residual quantity, where the coding quantity information is the buffer residual quantity, wherein the candidate for the group boundary in time direction is selected by comparing change in energy information of three successive time groups.

16. The non-transitory computer-readable data storage medium according to claim 15, wherein the audio encoding program is characterized in, at the moment of generating said maximum value, deciding said maximum value by employing coding quantity information that occurred in the past.

17. The non-transitory computer-readable data storage medium according to claim 15, wherein the audio encoding program is characterized in, at the moment of generating said maximum value, deciding said maximum value by employing usable coding quantity information.

18. The non-transitory computer-readable data storage medium according to claim 15, wherein the audio encoding program is characterized in, at the moment of generating said time group, generating the time group so that a time group quantity becomes said maximum value when the number of said candidates is less than or equal to said maximum value, the time group quantity corresponding to a number of time groups or a group number being generated.

19. The non-transitory computer-readable data storage medium according to claim 15, wherein the audio encoding program is characterized in, at the moment of generating said time group, generating the time group by employing all of said candidates when the number of said candidates is fewer than said maximum value.

20. The non-transitory computer-readable data storage medium according to claim 15, wherein the audio encoding program is characterized in, at the moment of generating said time group, settling the group boundary at a position different from that of said candidate so that the space of the boundary of the group being generated in the time direction becomes equal to or more than a constant.

21. The non-transitory computer-readable data storage medium according to claim 15, wherein the audio encoding program is characterized in, at the moment of generating said frequency group, conducting the grouping in the frequency direction by employing a difference between said maximum value and the number of said groups generated in the time direction.

22. A non-transitory computer-readable record medium having a program recorded therein for conducting grouping of a subband signal obtained by frequency-converting an input audio signal in a time direction and a frequency direction for each frame unit, and encoding the signal for each unit of the grouping, said record medium characterized in having a program recorded therein for causing an information processing device to execute the processes of:
calculating a candidate for a group boundary in the time direction;
generating a maximum value of a group number in the time direction;
employing said candidate, thereby to conduct the grouping in the time direction so that a space of the boundary of the group being generated in the time direction becomes equal to or more than a constant and yet the group number in the time direction becomes equal to or less than said maximum value, and to generate time direction group information;
and conducting the grouping in the frequency direction by employing said maximum value and said time direction group information,
wherein said maximum value of said group number is made variable according to coding quantity information,
wherein a maximum time group quantity is determined in response to a buffer residual quantity, where the coding quantity information is the buffer residual quantity;
wherein the candidate for the group boundary in time direction is selected by comparing change in energy information of three successive time groups.

23. An audio encoding device for conducting grouping of a subband signal obtained by frequency-converting an input audio signal in a time direction and a frequency direction for each frame unit, and encoding the signal for each unit of the grouping, characterized in comprising:
a candidate extraction unit for calculate a candidate for a group boundary in the time direction;
a maximum value generation unit for generating a maximum value of a group number in the time direction;
a time group generation unit for employing said candidate, thereby to conduct the grouping in the time direction so that the group number in the time direction becomes equal to or less than said maximum value, and to generate time direction group information;
and a frequency group generation unit for conducting the grouping in the frequency direction by employing a difference between said maximum value and the number of said groups generated in the time direction,
wherein said maximum value of said group number is made variable according to coding quantity information,
wherein a maximum time group quantity is determined in response to a buffer residual quantity, where the coding quantity information is the buffer residual quantity;
wherein the candidate for the group boundary in time direction is selected by comparing change in energy information of three successive time groups.

24. An audio encoding method of conducting grouping of a subband signal obtained by frequency-converting an input audio signal in a time direction and a frequency direction for each frame unit, and encoding the signal for each unit of the grouping, characterized in:
calculating a candidate for a group boundary in the time direction;
generating a maximum value of a group number in the time direction;
employing said candidate, thereby to conduct the grouping in the time direction so that the group number in the time direction becomes equal to or less than said maximum value, and to generate time direction group information; and
conducting the grouping in the frequency direction by employing a difference between said maximum value and the number of said groups generated in the time direction,
wherein said maximum value of said group number is made variable according to coding quantity information,
wherein a maximum time group quantity is determined in response to a buffer residual quantity, where the coding quantity information is the buffer residual quantity;
wherein the candidate for the group boundary in time direction is selected by comparing change in energy information of three successive time groups.

25. A non-transitory computer-readable data storage medium storing an audio encoding program for conducting grouping of a subband signal obtained by frequency-converting an input audio signal in a time direction and a frequency direction for each frame unit, and encoding the signal for each unit of the grouping, characterized in causing an information processing device to execute the processes of:
calculating a candidate for a group boundary in the time direction;
generating a maximum value of a group number in the time direction;

employing said candidate, thereby to conduct the grouping in the time direction so that the group number in the time direction becomes equal to or less than said maximum value, and to generate time direction group information; and conducting the grouping in the frequency direction by employing a difference between said maximum value and the number of said groups generated in the time direction, wherein said maximum value of said group number is made variable according to coding quantity information, wherein a maximum time group quantity is determined in response to a buffer residual quantity, where the coding quantity information is the buffer residual quantity;

wherein the candidate for the group boundary in time direction is selected by comparing change in energy information of three successive time groups.

26. A non-transitory computer-readable record medium having a program recorded therein for conducting grouping of a subband signal obtained by frequency-converting an input audio signal in a time direction and a frequency direction for each frame unit, and encoding the signal for each unit of the grouping, said record medium characterized in having a program recorded therein for causing an information processing device to execute the processes of:

calculating a candidate for a group boundary in the time direction;

generating a maximum value of a group number in the time direction;

employing said candidate, thereby to conduct the grouping in the time direction so that the group number in the time direction becomes equal to or less than said maximum value, and to generate time direction group information; and conducting the grouping in the frequency direction by employing a difference between said maximum value and the number of said groups generated in the time direction, wherein said maximum value of said group number is made variable according to coding quantity information, wherein a maximum time group quantity is determined in response to a buffer residual quantity, where the coding quantity information is the buffer residual quantity;

wherein the candidate for the group boundary in time direction is selected by comparing change in energy information of three successive time groups.

* * * * *